(12) United States Patent
Qu et al.

(10) Patent No.: US 8,200,240 B1
(45) Date of Patent: Jun. 12, 2012

(54) METHOD AND SYSTEM FOR USE OF A TRUSTED SERVER TO FACILITATE LOCATION DETERMINATION

(75) Inventors: Jing Qu, Reston, VA (US); Stephanie Teng-Ossman, SW Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 375 days.

(21) Appl. No.: 12/623,847

(22) Filed: Nov. 23, 2009

(51) Int. Cl.
*H04W 24/00* (2009.01)

(52) U.S. Cl. ............... 455/456.1; 455/404.2; 455/456.2; 455/456.6

(58) Field of Classification Search ............ 455/403, 455/404.1, 404.2, 418–420, 432.1, 456.1–457, 455/466, 517; 370/310, 328, 338, 352–354; 709/204, 227, 228; 701/200, 213–215; 340/426.19, 340/539.13, 988, 993
See application file for complete search history.

(56) References Cited

U.S. PATENT DOCUMENTS

| | | | | |
|---|---|---|---|---|
| 7,890,119 B2* | 2/2011 | Jethwa et al. | | 455/456.1 |
| 7,942,936 B2* | 5/2011 | Golden | | 726/35 |
| 7,962,153 B2* | 6/2011 | Yan | | 455/456.1 |
| 7,970,396 B2* | 6/2011 | Shim | | 455/432.1 |
| 8,095,151 B2* | 1/2012 | Kall et al. | | 455/456.1 |
| 2006/0265737 A1* | 11/2006 | Morris | | 726/3 |
| 2008/0133762 A1* | 6/2008 | Edge et al. | | 709/228 |
| 2010/0316006 A1* | 12/2010 | Thomson et al. | | 370/329 |

* cited by examiner

*Primary Examiner* — Anthony Addy (57) ABSTRACT

Disclosed is a method and system for use of a trusted server such as an over-the-air provisioning server to facilitate mobile location determination. If a mobile location server (MLS) sends a location-determination message to a mobile station and does not receive a response back from the mobile station, there is a chance that the mobile station is not provisioned with a correct address of the MLS and that the mobile station therefore did not respond. To help jump start the location-determination process, the MLS may respond to that situation by instead causing a trusted server such as an over-the-air-service-provisioning (OTASP) server to send a location-determination message to the mobile station, triggering a response from the mobile station.

19 Claims, 5 Drawing Sheets

METHOD AND SYSTEM FOR USE OF A TRUSTED SERVER TO FACILITATE LOCATION DETERMINATION

BACKGROUND

Cellular wireless is an increasingly popular means of personal communication in the modern world. To provide cellular wireless communication services, a wireless carrier typically operates a radio access network (RAN), which may include numerous base transceiver stations (BTSs or "base stations") and associated network infrastructure. Each BTS radiates to define one or more wireless coverage areas such as a cell and cell sectors in which mobile stations can communicate with the BTS over an air interface. The BTS may then be coupled with other network elements (such a radio network controller and switching center), which may control aspects of the air interface (such as channel assignment and handoff between coverage areas) and other aspects of RAN operation. Further, the network infrastructure may provide connectivity with the public switched telephone network (PSTN) and may further provide connectivity with a packet-switched network such as the Internet or a private packet network. With this arrangement, a mobile station operating within coverage of a BTS may communicate through the RAN with entities on the PSTN and/or the packet-switched network, as well as with other mobile stations served by the RAN.

In practice, for instance, to place a call over the PSTN, a mobile station equipped to do so may transmit a call origination message over an air interface access channel to RAN, providing dialed digits. Upon receipt of the call origination message, the RAN may then assign an air interface traffic channel for use by mobile station to engage in the call, and RAN may set up the call over the PSTN to the called number. Similarly, when the RAN receives a request to connect a call to the mobile station, the RAN may page the mobile station over an air interface paging channel and may assign an air interface traffic channel for the call.

To engage in packet-data communication on the packet-switched network, on the other hand, the mobile station may need to acquire a radio link, a data link, and an network address (e.g., Internet Protocol (IP) address). To do so, for instance, the mobile station may transmit a packet-data origination request message over an air interface access channel to the RAN. Upon receipt of that message, the RAN may then assign an air interface traffic channel for use by the mobile station as a radio link. Further, the RAN or an associated entity may negotiate with the mobile station to establish a data link and to assign or arrange for assignment of an IP address for use by mobile station to communicate as a node on the packet-switched network.

An important feature of contemporary cellular wireless networks is an ability to locate the geographical position of a mobile station. Such a feature was initially developed to assist emergency services in locating a mobile station. However, the availability of location information to support E911 services has given rise to the development of many other location-based services as well.

For instance, given the location of a mobile station, a location-based service provider/application (e.g., a cellular wireless carrier or third party) that is in PSTN or packet-switched communication with the mobile station can provide the mobile station user with a weather or traffic report relevant to the user's location. As another example, a location-based service provider can report a list of services or establishments (e.g., restaurants, parks, theatres, etc.) in the mobile station user's vicinity. As still another example, a location-based service provider can provide a mobile station user with a map of the user's location or with directions for travel between the user's location and another location. And as yet another example, knowing that a mobile station is operating in a particular location, a location-based service provider can send the mobile station a location-based message, such as an advertisement or coupon for a nearby establishment. Other location-based services exist currently or will be developed in the future as well.

In practice, when a location-based service (LBS) application wants to determine the location of a mobile station, the application may send a location request message to the wireless carrier that serves the mobile station (or, if the LBS application is hosted by the carrier itself, then the application may send the request within the carrier's network to a designated entity or logic for handling). In response, the carrier may then engage in a process to determine where the mobile station is currently located, and the carrier may then generate a response to the location request and send the response to the LBS application.

Typically, a wireless carrier will operate a mobile location server (MLS) that is arranged to determine and report mobile station locations to requesting entities. The MLS may include a "mobile positioning center" (MPC) and a position determining entity (PDE), which may be integrated together. The MLS may function to determine the location of a given mobile station based on various factors such as (i) the identity and location of the cell/sector in which the mobile station is currently operating, (ii) satellite-based positioning information provided by the mobile station, (iii) round trip signal delay measurements, and/or (iv) signal strength measurements. Further, the carrier may operate a front end server for receiving location requests from LBS applications and forwarding those requests to the MLS.

When the MLS receives a request for the location of a particular mobile station, the MLS (e.g., MPC/PDE) may thus determine the location of the mobile station. The MLS may then return the determined location of the mobile station to the requesting entity, and the requesting entity may then report or make use of the determined location, such as to provide a location-based service.

Oftentimes to determine the location of a mobile station, a carrier's MLS will need to obtain information from the mobile station itself. This information may comprise satellite positioning data, such as GPS readings or other data, information regarding the cell/sector in which the mobile station is currently operating, and information about signals that the mobile station is receiving from various base stations, for instance. To obtain this data from the mobile station, the MLS may thus need to communicate with the mobile station.

OVERVIEW

When an MLS faces a need to determine the location of a mobile station, the MLS may transmit to the mobile station a message related to the location determination process, such as a message seeking initiation of a location-determination communication session between the MLS and the mobile station. This message will originate from the MLS and will thus bear as a source address a network address (e.g., IP address) of the MLS.

Upon receipt of the message from the MLS, the mobile station may then respond to the MLS, thereby indicating to the MLS that the mobile station is available and willing to participate in the location-determination process. Either that response from the mobile station or a subsequent message from the mobile station to the MLS may also carry data usable by the MLS to facilitate the location determination process. For instance, the message from the mobile station may carry data identifying base stations nearby the mobile station and specifying distances of those base stations from the mobile station (as indicated by round trip signal delay measurements for instance). The MLS may use such base station distance measurements to approximate the location of the mobile station (by triangulation, given knowledge of the base station locations), so that the MLS can then send to the mobile station a set of ephemeris (satellite assistance) data that will enable the mobile station to tune to GPS satellites in the sky over the mobile station, and thereby to facilitate more granular location determination.

A mobile station may be provisioned (e.g., programmed) with data specifying the network addresses of various trusted servers with which the mobile station can communicate. For example, the mobile station may store the IP address of a conference server (e.g., push-to-talk (PTT) server) so that the mobile station can communicate with the conference server and thereby engage in conference calls (e.g., PTT sessions). As another example, the mobile station may store the IP address of an over-the-air service provisioning (OTASP) server from which the mobile station may receive service logic updates or the like, so that the wireless carrier can provision the mobile station with service logic and data updates when necessary. And as yet another example, the mobile station may store the IP address or other network address of the MLS, so that the mobile station can engage in location-determination messaging with the MLS.

The network address specified for a trusted server may be an IP address, to facilitate packet-data communication between an IP address of the mobile station and an IP address of the trusted server. Thus in practice, a the trusted server may send to the IP address of the mobile station a communication specifying as source address the IP address of the trusted server, and the mobile station may likewise send a communication from the IP address of the mobile station to the IP address of the trusted server.

Alternatively or additionally, the network address specified for a trusted server may be an address that would allow the mobile station to engage in WAP push type messaging with the trusted server for instance. With "WAP push" messaging, the trusted server may send a WAP push message to the mobile station, which the mobile station's serving RAN may deliver to the mobile station via a control channel (e.g., paging channel) or other channel, as a short messaging service (SMS) message according to industry standard IS-836 for instance. The WAP push message may itself specify a respond-to address in the form of an IP address, a universal resource locator, or another network address to which the mobile station should responsively communicate, and the mobile station may then respond by communicating to that specified address. A WAP push type message from a trusted server will typically specify a network address of the trusted server as a source address of the message. In turn, the mobile station's communication to the respond-to address may come from the IP address or other address of the mobile station.

In practice, the mobile station may be programmed to respond to a communication from a given server only if the communication originates from the network address that the mobile station has stored for that server, or more generally only if the source address of the communications is a legitimate one according to the mobile station's provisioning, and to disregard such communications if not from such expected addresses. This is a safeguard to help prevent the mobile station from responding to bogus messages from servers or other entities and thus to protect the mobile station from malicious network attacks. Further, the mobile station may be programmed with the legitimate address of each trusted server so that the mobile station itself can initiate communications to those servers when necessary.

For one reason or another, however, a trusted server address that is stored in the mobile station may be incorrect. This can occur, for instance, if a user of the mobile station adjusts programming of the mobile station to change a server address or if an application on the mobile station changes a server address, or in various other situations.

In terms of location determination, if the mobile station is programmed with an MLS address that is not the actual/correct address of the MLS, the mobile station may unfortunately not respond to legitimate communications from the MLS because those communications would specify a source address that does not match the MLS address stored in the mobile station. As a result, when the MLS sends to the mobile station a location-determination communication as mentioned above, the mobile station may erroneously determine that the communication is not from a legitimate address and the mobile station may therefore disregard the communication. Consequently, the MLS would not receive a response from the mobile station, and the location determination process would fail (or the MLS would need to resort to less desirable location-determination techniques, such as generally estimating the mobile station's location based on the location of a serving base station or other RAN infrastructure).

Disclosed herein is a method and associated system to help detect and deal with this problem in practice.

The method stems from the understanding that, if an MLS sends a message from the source address of the MLS to a destination address of the mobile station and the MLS does not receive a response back from the mobile station, an issue is whether the mobile station is provisioned with the wrong address of the MLS. To help resolve that issue and to jump-start the location determination process, the MLS will detect the lack of response from the mobile station and will responsively cause a different trusted server to send a communication to the destination address of the mobile station in an effort to trigger mobile station response communication from the mobile station to the MLS or to the trusted server.

Upon transmission of the communication from the trusted server to the destination address of the mobile station, if a response communication is then received from the mobile station, then a fair assumption is that the reason the mobile station did not respond to the initial MLS communication is that the mobile station was not properly provisioned with the correct address of the MLS. In that case, further location determination signaling can be conducted via the trusted server to help ensure that the mobile station processes and responds to the communications, or such a communication may re-provision the mobile station with a proper address of the MLS to allow the MLS itself to thereafter communicate to the mobile station.

On the other hand, if a response communication is not received from the mobile station, then a fair assumption is that some other problem exists in communicating with the mobile station. For instance, the mobile station may be out of coverage, or some other defect may exist in the communication path to the mobile station. In that case, the attempted location determination process can be aborted or the MLS can simply resort to determining location in a less accurate manner without interacting with the mobile station itself.

These as well as other aspects, advantages, and alternatives will become more apparent to those of ordinary skill in the art by reading the following detailed description, with reference where appropriate to the accompanying drawings. Further, it should be understood that this overview and the other description provided throughout this document is intended to describe the invention merely by way of example and that numerous other examples and variations may be possible without limitation to the specific details described.

DETAILED DESCRIPTION

As noted above, FIG. 1 is a simplified block diagram of a network in which the method can be implemented. It should be understood, however, that this and other block diagrams and flow charts are meant merely as examples and are not intended to be limiting, particularly since various protocols may call for use of different arrangements. As example variations from the arrangement shown, for instance, various elements and functions can be integrated together, split and distributed, replicated, repositioned, eliminated, re-ordered, renamed, or otherwise modified. Further, it should be understood that functions described as being carried out by a given network element can be carried out by a processor executing program instructions and/or by any combination of hardware, firmware, and/or software.

Figure 1:
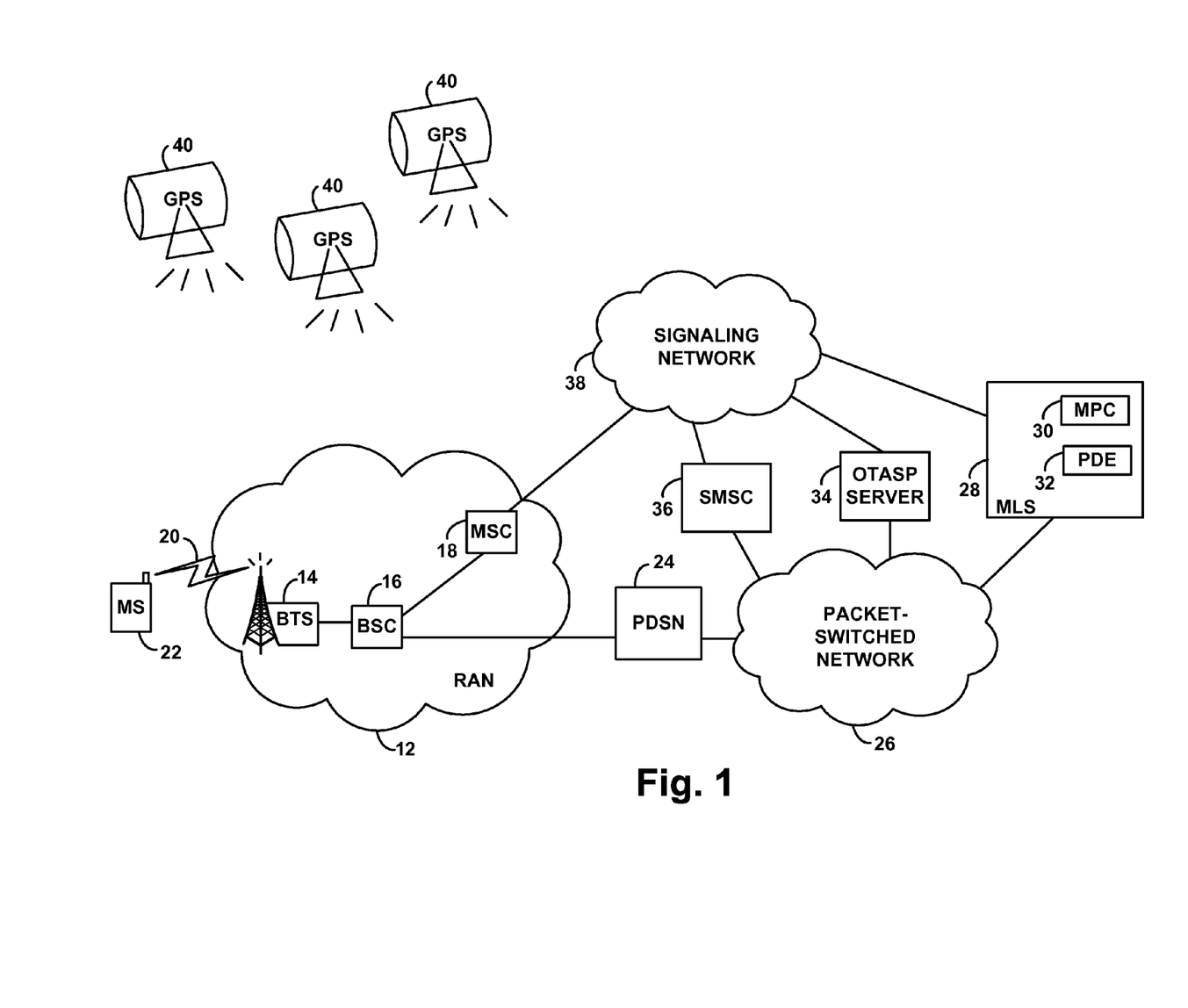
FIG. 1 is a simplified block diagram of a network in which the present method can be implemented.

As shown in FIG. 1, the network includes at its core an example RAN 12 with representative components including a BTS 14, a base station controller (BSC) 16, and a mobile switching center (MSC) 18. In this arrangement, BTS 14 radiates to define a radio frequency (RF) air interface 20 through which the BTS 14 may communicate with served mobile stations, such as a representative mobile station 22. This communication, and thus mobile station 22 and RAN 12, may operate in accordance with any agreed air interface protocol, examples of which include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed.

In example operation, BSC 16 controls BTS 14 and is coupled with MSC 18, which provides connectivity with the PSTN (not shown) so that served mobile stations can communicate with remote entities on the PSTN. Further, BSC 16 is coupled with a packet data serving node (PDSN) or other gateway 24, which provides connectivity with a packet-switched network 26, so that served mobile stations can engage in "user plane" communication with remote entities on the packet-switched network. And MSC 18 is coupled with a signaling network (e.g., Signaling System #7 (SS7) network) through which served mobile stations can engage in "control plane" communication with remote entities on the signaling network.

Shown sitting as nodes on both the packet-switched network 26 and signaling network 38 are an MLS 28 (including by way of example an MPC 30 and PDE 32), an OTASP server 34, and a short messaging service center (SMSC) 36. In line with the discussion above, MLS 28 preferably functions to determine and report mobile station location so as to facilitate location-based services, and OTASP server 34 preferably functions to provision mobile stations over the air with service logic (e.g. program logic) and service parameters. SMSC 36 in turn functions to store and forward SMS messages such as WAP Push messages to mobile stations.

In practice, a trusted server such as MLS 28 or OTASP server 34 may be arranged to engage in user plane communication with mobile station 22. To facilitate such communication, the trusted server may have an assigned IP address for communicating on the packet-switched network 26, and mobile station 22 may likewise have an assigned IP address for communicating on the packet-switched network 26. (These IP addresses may be globally assigned or may be local addresses subject to network address translation with port association.) Thus, a trusted server may send to the mobile station a communication specifying the trusted server's IP address as source address and specifying the mobile station's IP address as destination address, and the node may receive from the mobile station a communication specifying the mobile station's IP address as source address and specifying the trusted server's IP address as destination address.

Further, a trusted server such as MLS 28 or OTASP server 34 may be arranged to engage in control plane communication with mobile station 22. For instance, the trusted server may send a communication via packet-switched network 26 or signaling network 38 to SMSC 36, specifying as source address an address of the trusted server and specifying as destination address an address of the mobile station. SMSC 36 may then deliver the message to RAN 12 and RAN 12 may then transmit the message as a control channel message (e.g., a paging channel message or the like) over the air to mobile station 22. Likewise, mobile station 22 may send a control plane communication from a source address of the mobile station to a destination address of the trusted server.

Whether through user-plane or control-plane communication, a message from a trusted server to the mobile station may carry data and/or instructions for the mobile station. For example, a message from MLS 28 may provide the mobile station with ephemeris data usable by the mobile station to tune to particular GPS satellites 40 so as to facilitate location determination. As another example, a message from OTASP server 34 may carry a directive for mobile station 22 to carry out particular functions and may carry provisioning data for storage and use by the mobile station. Further, a message from a trusted server may cause the mobile station to engage in additional communication. For instance, a message from a trusted server may specify a respond-to address (e.g., IP address or URL), to which the mobile station should send a response communication, and the mobile station may react accordingly.

In practice, mobile station 22 may be any type of wireless communication device, whether actually mobile (movable) or stationary. For instance, mobile station 22 may be a handheld cellular telephone or personal digital assistant, a wireless data card or other wireless communication module adapted for connection with one or more devices, or a wirelessly equipped personal computer, appliance, vehicle, or other device, or may take any of a variety of other forms.

Figure 2:
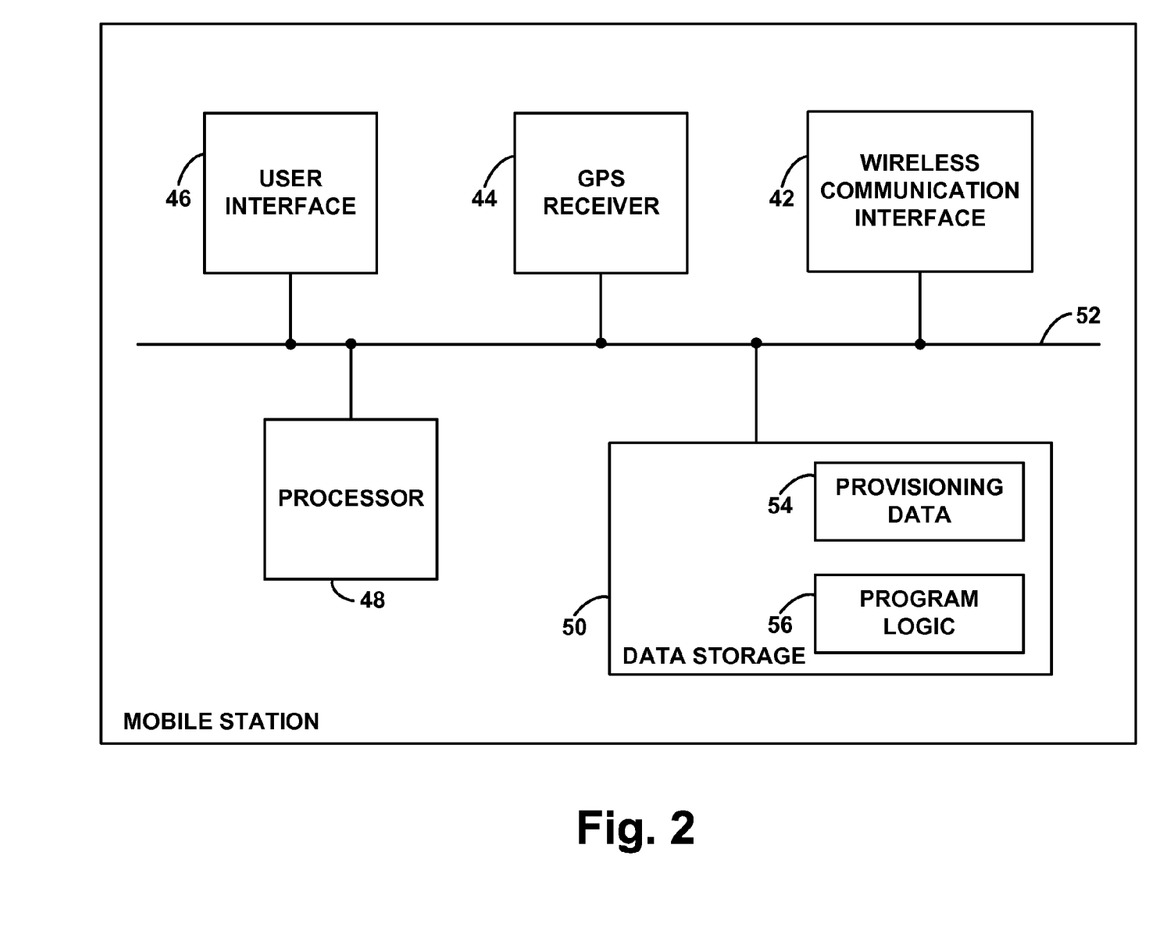
FIG. 2 is a simplified block diagram depicting components of an example mobile station operable in the network of FIG. 1.

FIG. 2 is a simplified block diagram of an example mobile station, showing some of the components that can be included in the device. As shown, the example mobile station includes a cellular wireless communication interface 42, a GPS receiver 44, a user interface 46, a processor 48, and data storage 50, all of which may be coupled together by a system bus, network, or other connection mechanism 52. The mobile station may take other forms as well.

Wireless communication interface 42 functions to facilitate air interface communication with RAN 12 according to one or more protocols such as those noted above. An exemplary wireless communication interface is an MSM series chipset manufactured by Qualcomm Incorporated, together with one or more internal or external antennas. Wireless communication interface 42 may operate together with processor 48 to acquire network connectivity, so as to enable the mobile station to engage in wireless packet data communications with entities on packet-switched network 26, and to receive WAP push messages such as SMS messages for instance.

GPS receiver 44 functions communicate with GPS satellites 40, so as to facilitate determination of the location of mobile station 22. For instance, the mobile station may obtain ephemeris data from MLS 28 and, in accordance with that data, may tune to various satellites and measure received satellite signals. With use of the ephemeris data, the mobile station may then geometrically compute its own location based on the measured satellite signals. Alternatively, the mobile station may provide the satellite signal measurements to the MLS, and the MLS may compute the mobile station's location. Although GPS receiver 44 is shown separate from wireless communication interface 42, the GPS receiver function can be integrated together with the wireless communication interface function, on a single chipset for instance. By way of example, the chipset could be a Qualcomm chipset having "gpsOne" functionality.

User interface 46 includes components for receiving input from a user of mobile station and providing output to a user of the mobile station. For instance, the user interface may include a keypad, touch-sensitive screen, microphone, and camera for receiving user input, and a display screen and speaker for providing user output. Further, the user interface 42 may include analog/digital conversion circuitry to facilitate conversion between analog user input/output and digital signals on which the mobile station can operate.

Processor 48 comprises one or more general purpose processors (such as INTEL processors or the like) and/or one or more special purpose processors (such as digital signal processors or application specific integrated circuits). To the extent processor 48 includes more than one processor, the processors could work separately or in combination. Data storage 50, in turn, comprises one or more volatile or non-volatile storage components, such as optical, magnetic, or organic storage, and data storage 50 can be integrated in whole or in part with processor 48.

As shown, the data storage 50 of the example mobile station includes provisioning data 54 and program logic 56, among other data.

Provisioning data 54 comprises data specifying various parameters and settings for the mobile station, such as addresses and identifiers of the mobile station and addresses and identifiers of trusted servers with which the mobile station is arranged to communicate. In terms of mobile station addresses and identifiers, for instance, the provisioning data may specify a network access identifier (NAI), an IP address, a mobile identification number, a mobile directory number, an electronic serial number. In terms of trusted server addresses and identifiers, for instance, the provisioning data may specify IP addresses and identifiers of MLS 28, OTASP server 34, and other servers. Some of this data may be hard-coded into the mobile station and thus unalterable, while other data may be established and revised through over the air provisioning (from OTASP server 34 for instance) or through manual programming of the mobile station.

Program logic 56 comprises machine language instructions or other sorts of logic executable by processor 48 to carry out various mobile station functions described in this document. For instance, the program logic may be executable to receive via wireless communication interface 42 a communication that designates a particular source address, to determine by reference to the provisioning data whether the designated source address is a legitimate address (e.g., for the type of communication received), to thereby determine whether to take particular action necessitated by the communication or whether to disregard the communication. Further, the program logic may be executable in response to receiving ephemeris data from MLS 28 to cause GPS receiver 44 to tune to GPS satellites 40 so as to obtain GPS signal measurements, and to report the measurements or associated computations to the MLS. Other examples are possible as well.

Figure 3:
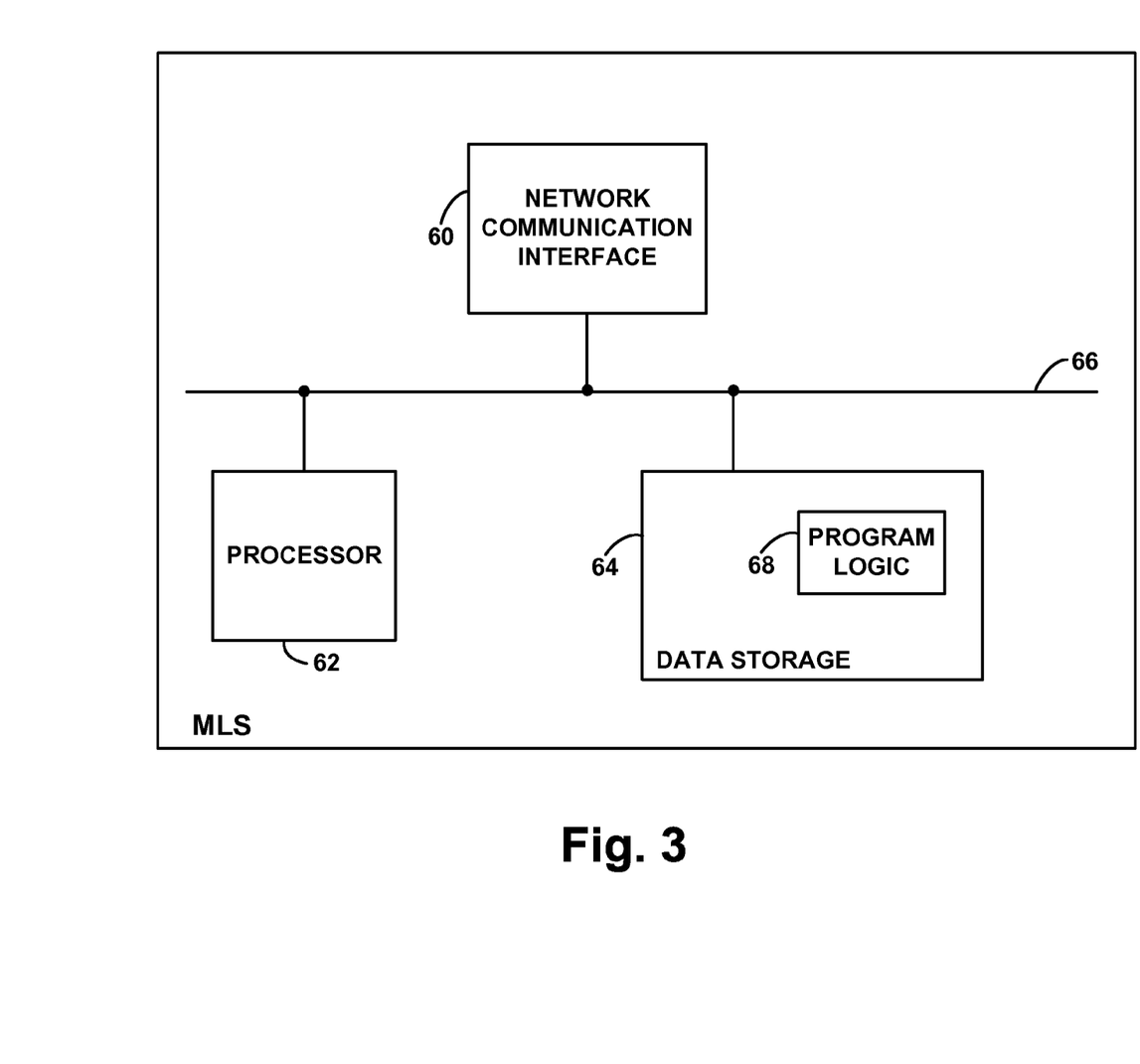
FIG. 3 is a simplified block diagram depicting components of an example MLS operable in the network of FIG. 1.

FIG. 3 is a simplified block diagram of an example MLS, showing some of the components that can be included in the system. As shown, the example MLS includes a network communication interface 60, a processor 62, and data storage 64, all of which may be coupled together by a system bus, network, or other connection mechanism 66. The MLS may take other forms as well. Further, it should be understood that, although the term "server" is used to characterize the MLS, the MLS "server" can in fact be a composition of numerous network nodes, including for instance numerous network servers or other entities.

Network communication interface 60 comprises any type of interface for connecting the MLS with a network through which the MLS can communicate with mobile station 22 and with other entities. For instance, the network communication interface may comprise a wired or wireless Ethernet interface that provides the MLS with connectivity to packet-switched network 26 as shown, and the network communication interface may have an assigned IP address on the packet-switched network. Alternatively or additionally, the network communication interface may comprise an interface for connecting with signaling network 38, to facilitate control plane communication between the MLS and mobile station 22.

Processor 62 comprises one or more general purpose processors (such as INTEL processors or the like) and/or one or more special purpose processors (such as digital signal processors or application specific integrated circuits). To the extent processor 62 includes more than one processor, the processors could work separately or in combination. Data storage 64, in turn, comprises one or more volatile or non-volatile storage components, such as optical, magnetic, or organic storage, and data storage 64 can be integrated in whole or in part with processor 62.

As shown, the data storage 62 of the example MLS includes program logic 68, such as machine language instructions or other sorts of logic executable by processor 62 to carry out various MLS functions described in this document. For example, the program logic may be executable to receive a request for the location of mobile station 22 and, to start or as part of the process of trying to determine the location of the mobile station, to transmit a location-determination message via communication interface 60 to the mobile station, where the location-determination message specifies as source address an address of the MLS and specifies as destination address an address of the mobile station. As another example, the program logic may be executable to detect that the mobile station has not responded to that location-determination message, and to responsively cause a trusted server (such as OTASP server 34) to instead send to the mobile station a location-determination message specifying as source address an address of the trusted server.

Further, the MLS program logic may be executable in this process to provide the mobile station with ephemeris data and/or other data to enable the mobile station to take actions to facilitate location determination, and to receive from the mobile station measurement data (such as base station signal delay measurements and satellite signal measurements) to facilitate location determination. And the program logic may be executable to report determined mobile station location to a requesting entity.

Figure 4:
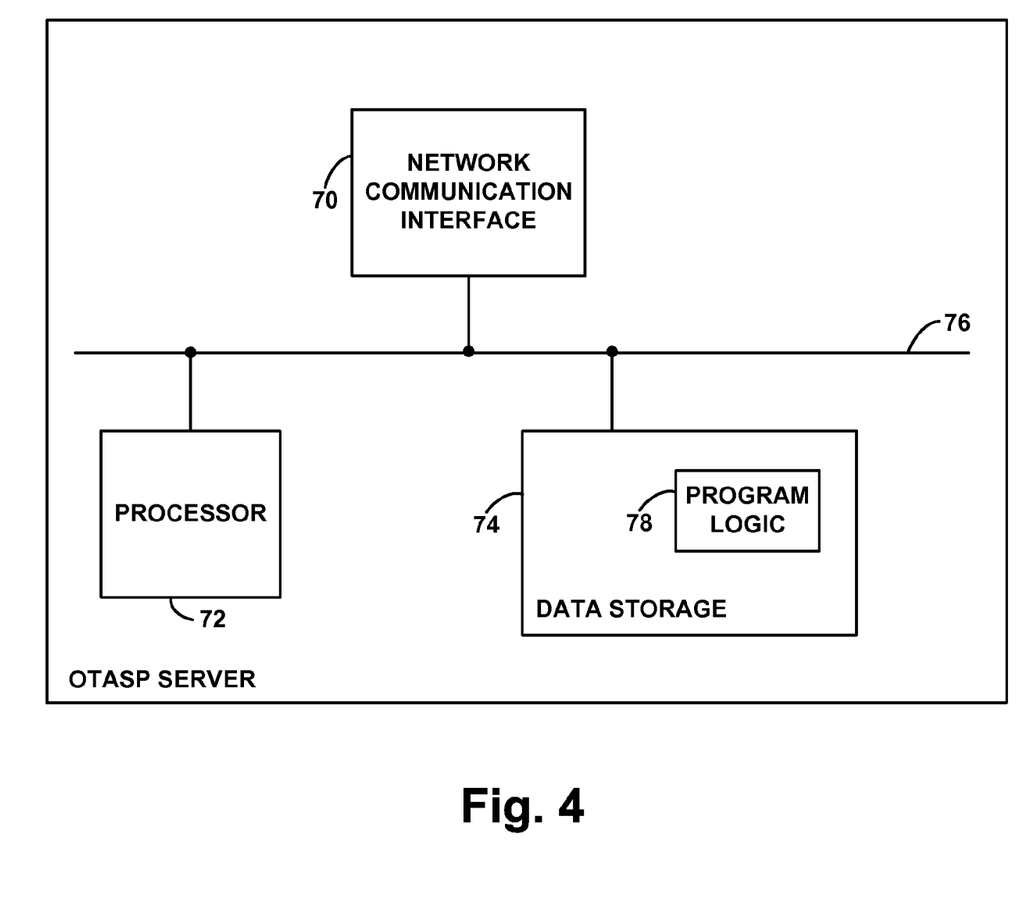
FIG. 4 is a simplified block diagram depicting components of an example OTASP server operable in the network of FIG. 1.

FIG. 4 is next a simplified block diagram of an example OTASP server, showing some of the components that can be included in the server. As shown, the example OTASP server includes a network communication interface 70, a processor 72, and data storage 74, all of which may be coupled together by a system bus, network, or other connection mechanism 76. The OTASP server may take other forms as well. Further, it should be understood that, although the term "server" is used to characterize the OTASP server, the OTASP "server" can in fact be a composition of numerous network nodes, including for instance numerous network servers or other entities.

Network communication interface 70 comprises any type of interface for connecting the OTASP server with a network through which the OTASP server can communicate with mobile station 22 and with other entities. For instance, the network communication interface may comprise a wired or wireless Ethernet interface that provides the OTASP server with connectivity to packet-switched network 26 as shown, and the network communication interface may have an assigned IP address on the packet-switched network. Alternatively or additionally, the network communication interface may comprise an interface for connecting with signaling network 38, to facilitate control plane communication between the OTASP server and mobile station 22.

Processor 72 comprises one or more general purpose processors (such as INTEL processors or the like) and/or one or more special purpose processors (such as digital signal processors or application specific integrated circuits). To the extent processor 72 includes more than one processor, the processors could work separately or in combination. Data storage 74, in turn, comprises one or more volatile or non-volatile storage components, such as optical, magnetic, or organic storage, and data storage 74 can be integrated in whole or in part with processor 72.

As shown, the data storage 74 of the example OTA server includes program logic 78, such as machine language instructions or other sorts of logic executable by processor 72 to carry out various OTA server functions described in this document. For example, the program logic may be executable to transmit new service logic (e.g., firmware updates), provisioning data, and directives to mobile stations such as mobile station 22. Further, the program logic may be executable to receive a communication from MLS 28 providing information for transmission to mobile station 22, and to responsively generate and transmit to mobile station a message providing that information, where the message bears as source address an address of the OTASP server and as destination address an address of the mobile station. Likewise, the program logic may be executable to receive from mobile station 22 a communication providing information and to forward the information to the MLS 28.

Figure 5:
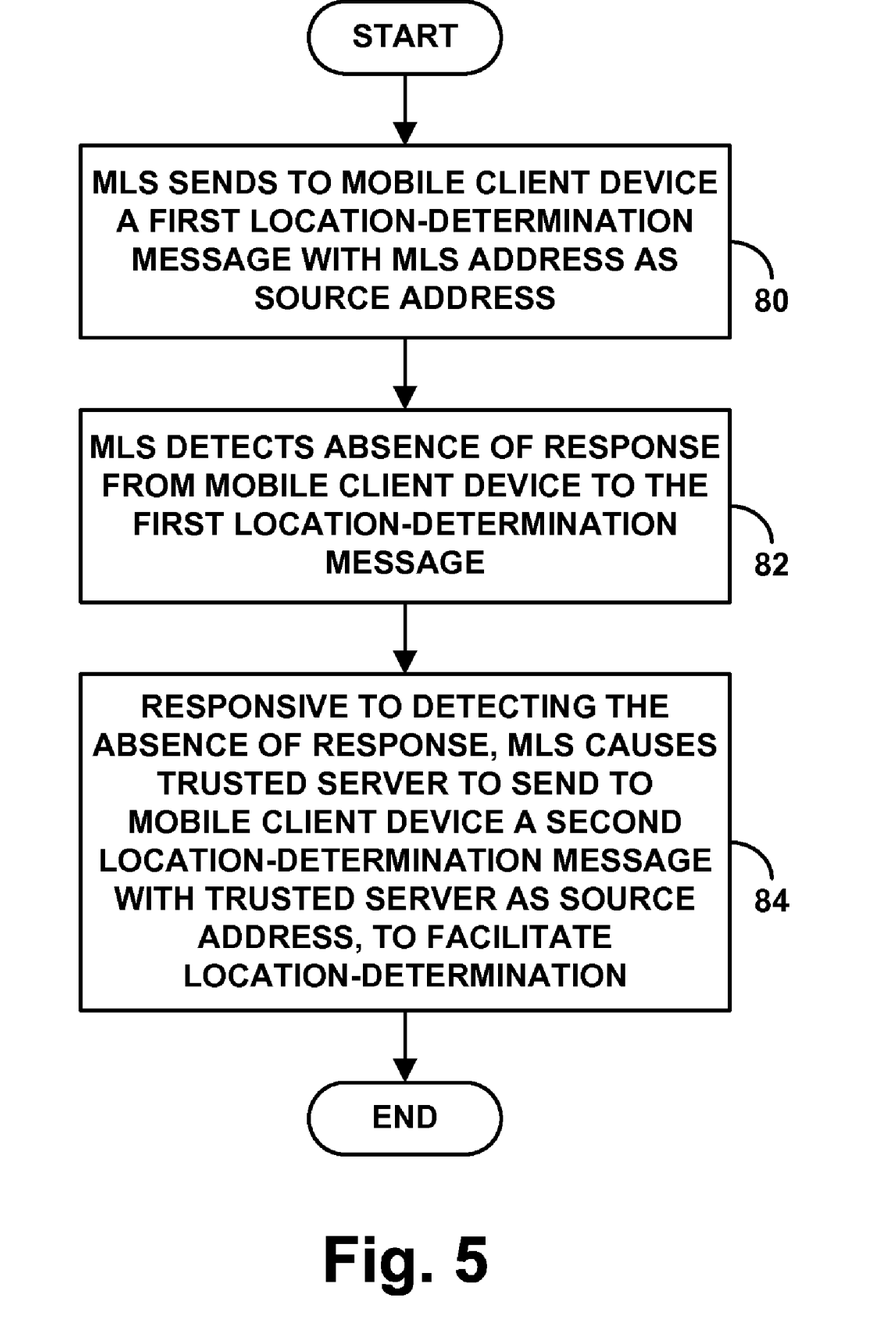
FIG. 5 is a flow chart depicting functions that can be carried out in accordance with the exemplary method.

FIG. 5 is next a flow chart depicting functions that can be carried out in accordance with the present method, in the arrangement of FIG. 1 for instance. As shown in FIG. 4, at block 80, the method involves MLS 28 sends to mobile station 22 (or any other mobile client for that matter) a first location-determination message that designates as an origination address of the first location-determination message a network address of the mobile location server. At block 82, the MLS then detects that the mobile client device has not responded to the sent first location-determination message (e.g., by detecting that the MLS has not received from the mobile client device a response to the first location-determination message within a threshold period of time). At block 84, responsive to detecting that lack of a response, the MLS then causes a trusted server to send to the mobile client device a second location-determination message that designates as an origination address of the second location-determination message a network address of the trusted server that will facilitate determination of a geographic location of the mobile client device.

As discussed above, the trusted server that the MLS causes to communicate with the mobile station may be the OTASP server 34, and the mobile client device is preferably configured to communicate with the OTASP server (e.g., by having the OTASP server's address stored as provisioning data indicating a legitimate address from which to receive OTASP communications, and including logic to respond to such communications).

Further, the act of the MLS sending the first location-determination message may involve sending the first location-determination message as an IP communication, and so the network address of the MLS may be an IP address of the MLS. And the act of detecting that the mobile client device has not responded to the sent first location-determination message may involve detecting an absence of a response IP communication from the mobile client device. In turn, the act of the trusted server (e.g., OTASP server) sending the second location-determination message may involve the trusted server sending the second location-determination message as an IP communication.

In practice, the second location-determination message may include as a respond-to address an address of the MLS 28 or an address of the trusted server. If the respond-to address is an address of the MLS, then the MLS may receive from the mobile client device a response communication, which the MLS would take as a signal indicating that the mobile client device received and responded to the second-location determination message. On the other hand, if the respond-to address is an address of the trusted server or if the mobile client device for some other reason responds to the trusted server, then the trusted server may responsively transmit a message (e.g., the communication received from the mobile client device) to the MLS, which the MLS would treat as an indication that the mobile client device received and responded to the second-location determination message.

In this arrangement, the first and/or second location-determination messages may carry ephemeris data usable by the mobile client device as a basis to tune to one or more positioning satellites (e.g., GPS satellites 40) so as to acquire data for use in determining a geographic location of the mobile device. Alternatively, the first and second location-determination messages could instead each be a message seeking to initiate a location-determination communication session with the mobile client device, and thus functioning as a probe to determine whether the mobile client device is available and able to engage in location-determination communication.

Upon detecting that the mobile client device does not respond to the first location-determination message, the MLS may then cause the trusted server (e.g., OTASP server) to send the second and perhaps subsequent location-determination related messages to the mobile client device so as to facilitate mobile client device responses. Alternatively, the second or a subsequent location-determination message sent by the trusted server may provide the mobile client device with updated provisioning data that helps ensure that the mobile client device can receive and respond to communications originated by the MLS. For instance, a location-determination message sent by the OTASP server may re-provision the mobile client device with a proper address of the MLS, so that the mobile client device would thereafter properly respond to communications originated from that address. On the other hand, it may be better to not change the provisioning of the mobile client device and to instead just have the trusted server (e.g., OTASP server) originate communications to the mobile device with the MLS address specified as a respond-to address, to cause the mobile device to respond directly to the MLS on just a message by message basis.

Of the location-determination messages that are successfully sent to the mobile client device (e.g., originated by the trusted server), one such message may be a WAP push message or the like that causes the mobile client device to respond with a specification of the mobile client device's GPS capability. For instance, the message may cause the mobile client device to respond with a specification of a micro-browser version or firmware version of the mobile client device, and the MLS may determine based on the specified version whether the mobile client device is GPS capable. Based on that determination, the MLS may then determine whether to provide the mobile client device with ephemeris data and to request GPS signal measurements or associated data from the mobile client device. For instance, the MLS may condition sending of ephemeris data to the mobile client device on first determining that the mobile client device is GPS-capable.)

Further, another such message that is successfully sent to the mobile client device (e.g., originated by the trusted server) may be a WAP push message or the like that causes the mobile client device to respond with an identifier of the base station currently serving the mobile station. The MLS may then use that base station identifier as a basis to select ephemeris data correlated with satellites in the sky over the location of that base station.

After determining that the mobile client device is GPS-capable and after selecting ephemeris data for use by the mobile client device, the MLS may then send the ephemeris data to the mobile client device with or as a directive for the mobile client device to obtain and report GPS signal measurements. In particular, the MLS may send the ephemeris data to the trusted server, and the trusted server may originate a message (e.g., a third location-determination message) to the mobile client device from the address of the trusted server, providing the mobile client device with the ephemeris data and with a directive for the mobile client device to report determined geographic location information to a network address of the MLS. Alternatively, if the mobile client device has been re-provisioned by this point to receive location-determination communications originated by the MLS (bearing as source address the address of the MLS), this ephemeris data can be sent to the mobile client device in a message originated by the MLS.

Further, this or another subsequent location-determination message may direct the mobile client device to determine the geographic location of the mobile device and to report the determined geographic location to the network address of the mobile location server. Thus, the mobile client device may use the provided ephemeris data as a basis to obtain GPS signal measurements, the mobile client device may use the measurements and ephemeris data to compute a location of the mobile device, and the mobile device may report the computed location to a designated respond-to address for ultimate receipt by the MLS.

In summary, at the start of this process the MLS was unable to engage in location-determination communication with the mobile client device, perhaps because the mobile client device was for some reason not provisioned with the correct address of the MLS. The process then enables the MLS to engage in location-determination communication with the mobile client device, leveraging the trusted communication relationship that exists between the trusted server (e.g., OTASP server) and the mobile client device. Thus, assuming the mobile client device is GPS capable, the MLS can thereby provide the mobile client device with ephemeris data to facilitate granular determination of the location of the mobile client device.

An exemplary embodiment of the present method and system has been described above. Those of ordinary skill in the art will appreciate, however, that modifications from the embodiment described can be made while remaining within the spirit and scope of the invention as claimed.

What is claimed is:

1. A method comprising:
   a mobile location server sending to a mobile client device a first location-determination message that designates as an origination address of the first location-determination message a network address of the mobile location server, wherein the network address of the mobile location server is an Internet Protocol (IP) address of the mobile location server;
   the mobile location server then detecting that the mobile client device has not responded to the sent first location-determination message, wherein detecting that the mobile client device has not responded to the sent first location-determination message comprises detecting an absence of a responsive IP communication from the mobile client device;
   responsive to the detecting, the mobile location server causing a trusted server to send to the mobile client device a second location-determination message that designates as an origination address of the second location-determination message a network address of the trusted server and that directs the mobile client device to send a response to the mobile location server, to facilitate determination of a geographic location of the mobile client device, wherein
   the trusted server is other than the mobile location server; and
   the mobile location server then receiving the response.

2. The method of claim 1, wherein the trusted server comprises an over-the-air-service-provisioning (OTASP) server with which the mobile client device is configured to communicate.

3. The method of claim 1,
   wherein sending the first location-determination message comprises sending the first location-determination message as an IP communication.

4. The method of claim 3,
   wherein sending the second location-determination message comprises sending the second location-determination message as an IP communication, and wherein the network address of the trusted server is an IP address of the trusted server.

5. The method of claim 4,
   wherein receiving the signal comprises the mobile location server receiving the signal from the trusted server wherein the signal is sent to the mobile location server by the trusted server upon the trusted server receiving from the mobile client device a response to the second location-determination message.

6. The method of claim 4, further comprising:
after receipt of the signal, sending to the mobile client device ephemeris data usable by the mobile client device as a basis to tune to one or more positioning satellites to obtain data for use in determining a geographic location of the mobile client device.

7. The method of claim 6, wherein sending the ephemeris data to the mobile client device comprises causing the trusted server to send the ephemeris data in a third location-determination message to the mobile client device from the network address of the trusted server.

8. The method of claim 6, wherein the third location-determination message directs the mobile client device to determine the geographic location of the mobile device and to report the determined geographic location to the network address of the mobile location server.

9. The method of claim 6, further comprising:
determining an identity of a cellular base station that is serving the mobile client device; and
using the determined identity as a basis to select the ephemeris data to send to the mobile client device, wherein sending the ephemeris data to the mobile client device comprises sending the selected ephemeris data to the mobile client device.

10. The method of claim 9, wherein the determining and using functions are performed by the mobile location server.

11. The method of claim 6, further comprising:
determining if the mobile client device is GPS-capable; and
conditioning sending of the ephemeris data to the mobile client device on a determination that the mobile client device is GPS-capable.

12. The method of claim 11, wherein determining if the mobile client device is GPS-capable comprises:
sending or causing to be sent to the mobile client device a trigger message that causes the mobile client device to respond with an indication of a mobile client device characteristic comprising at least one of a firmware version of the mobile client device and a microbrowser version of the mobile client device; and
receiving in response the indication of the mobile client device characteristic, and using the received indication as a basis to determine if the mobile client device is GPS-capable.

13. The method of claim 12, wherein the second location-determination message functions as the trigger message.

14. The method of claim 4, wherein the second location-determination message carries ephemeris data usable by the mobile client device as a basis to tune to one or more positioning satellites to obtain data for use in determining a geographic location of the mobile client device.

15. The method of claim 14, wherein the second location-determination message directs the mobile client device to determine the geographic location of the mobile client device and to report the determined geographic location to the network address of the mobile location server.

16. The method of claim 14, further comprising:
determining an identity of a cellular base station that is serving the mobile client device;
using the determined identity as a basis to select the ephemeris data to send to the mobile client device; and
providing the selected ephemeris data to the trusted server for inclusion as the ephemeris data in the second location-determination message.

17. A mobile location server comprising:
a network communication interface;
a processor;
data storage; and
program logic stored in the data storage and executable by the processor to carry out functions comprising:
causing the network communication interface to send to a mobile client device a first location-determination message that designates as an origination address of the first location-determination message a network address of the mobile location server, wherein the network address of the mobile location server is an Internet Protocol (IP) address of the mobile location server,
then detecting that the mobile client device has not responded to the sent first location-determination message, wherein detecting that the mobile client device has not responded to the sent first location-determination message comprises detecting an absence of a responsive IP communication from the mobile client device,
responsive to the detecting, causing a trusted server to send to the mobile client device a second location-determination message that designates as an origination address of the second location-determination message a network address of the trusted server and that directs the mobile client device to send a response to the mobile location server, to facilitate determination of a geographic location of the mobile client device, wherein the trusted server is other than the mobile location server; and
then receiving the response.

18. The mobile location server of claim 17, wherein the functions further comprise:
responsive to receiving the response, sending to the mobile client device ephemeris data usable by the mobile client device as a basis to tune to one or more positioning satellites to obtain data for use in determining a geographic location of the mobile client device.

19. The mobile location server of claim 17, wherein the functions further comprise:
determining if the mobile client device is GPS-capable; and
conditioning sending of the ephemeris data to the mobile client device on a determination that the mobile client device is GPS-capable.

* * * * *